Sept. 29, 1970  A. ROPPEL ET AL  3,531,194

MOTION PICTURE CAMERA WITH ADJUSTABLE SHUTTER

Filed Oct. 10, 1968

INVENTORS:
ALFRED ROPPEL
JOHANN ROTH

BY Michael S. Striker their ATTORNEY

United States Patent Office 3,531,194
Patented Sept. 29, 1970

3,531,194
MOTION PICTURE CAMERA WITH ADJUSTABLE SHUTTER
Alfred Roppel, Munich, and Johann Roth, Schwabhausen, Germany, assignors to Niezoldi & Kramer G.m.b.H., Munich, Germany
Filed Oct. 10, 1968, Ser. No. 766,429
Claims priority, application Germany, Oct. 17, 1967, 1,597,340
Int. Cl. G03b 9/12, 9/62
U.S. Cl. 352—216                                21 Claims

ABSTRACT OF THE DISCLOSURE

A motion picture camera wherein the motor drives a hollow shaft carrying a first shutter blade and the hollow shaft accommodates a second shaft carrying a second shutter blade. The second shaft is turnable in the hollow shaft so that the angular positions of the two blades can be changed in order to furnish a shutter opening of greater or lesser size. The means for changing the angular position of the second shaft comprises a sleeve which is movable axially on the outer shaft and has a pin extending into a helical groove of the second shaft and through an axially parallel slot of the outer shaft so that the outer shaft invariably drives the inner shaft but the pin can change the angular position of the inner shaft in response to axial movement of the sleeve. The sleeve is movable axially by a manually operable selector which is normally biased to a neutral position in which it can be shifted by hand in parallelism with the common axis of the shafts to thereby change the axial position of the sleeve. In addition, the selector is pivotable in two directions from its neutral position to thereby receive motion from the motor which drives the outer shaft. The arrangement is such that the selector moves the sleeve in one axial direction in response to pivoting to one side of its neutral position and that the selector moves the sleeve in the other axial direction in response to pivoting to the other side of its neutral position.

BACKGROUND OF THE INVENTION

The present invention relates to photographic apparatus in general, and more particularly to improvements in motion picture cameras, especially to improvements in motion picture cameras for use by amateurs. Still more particularly, the invention relates to improvements in motion picture cameras with adjustable shutters.

It is already known to provide the shutter of a motion picture camera with two rotary blades which are turnable with reference to each other to thereby change the exposure time by changing the size of the opening which admits scene light to unexposed film frames. The means for turning one of the blades with reference to the other blade comprises a selector which can turn the one blade by way of a sleeve movable along the common axis of the blades. The other blade is driven by the motor of the motion picture camera and transmits torque to the one blade by way of the sleeve. To this end, the other blade is fixed to a hollow drive shaft and the one blade is fixed to a second shaft which is rotatable in the hollow shaft and has a helical groove receiving a projection of the sleeve. Such projection also couples the sleeve for rotation with the hollow shaft.

It is also known to employ the motor which drives the shutter as a means for varying the size of the shutter opening. Such motion picture cameras must be provided with a complicated transmission system which can reduce or increase the size of the opening in order to produce a fade-in or fade-out effect. A drawback of such cameras is that the size of the shutter opening cannot be selected by hand and that selection of the opening by the motor is unreliable because the operator cannot rapidly return the sleeve to a position corresponding to the normal or average size of the opening, for example, the size which is best suited to furnish a satisfactory exposure time for taking pictures of rapidly moving bodies travelling at right angles to the optical axis of the objective. Furthermore, the aforementioned transmission system is quite expensive and prone to malfunction so that it is not suited for use in cameras which are intended to be operated by amateur photographers.

SUMMARY OF THE INVENTION

One of the objects of our present invention is to provide a motion picture camera with an adjustable shutter which can be adjusted by hand and/or by means of a motor.

Another object of the invention is to provide a motion picture camera wherein the shutter can be adjusted to produce a fade-in or fade-out effect or in such a way that the shutter furnishes one of a wide range of exposure times.

A further object of the invention is to provide a motion picture camera wherein the adjustment of the shutter by means of a motor can be effected by manipulating that part which is utilized to effect purely manual selection of the shutter opening and hence of the exposure time.

An additional object of the invention is to provide a relatively simple mechanism which can effect manual or motoric adjustment of the shutter and which occupies little room so that it can be readily installed in cameras for amateur photographers.

An ancillary object of the invention is to provide a novel driving connection between the motor which drives the shutter blades and the device which permits manual selection of the exposure time.

A concomitant object of the invention is to provide a camera which embodies the above outlined shutter and which can furnish readily detectable signals to indicate one or both extreme sizes of the shutter opening.

A further object of the invention is to provide a camera wherein the shutter is automatically arrested when the size of its opening its reduced to zero.

The improved motion picture camera comprises an adjustable shutter having a pair of coaxial rotary blades defining a light-admitting opening, one of the blades being turnable with reference to the other blade to thereby change the size of the opening, turning means movable along the common axis of the blades and operatively connected with the one blade to turn the latter and to thus increase or reduce the size of the opening while respectively moving in a first and a second direction, selector means coupled with the turning means and having a neutral position in which it is movable by hand in parallelism with the common axis of the blades to move the turning means in a desired one of the two directions, the selector means having at least one second position, and motor means for moving the selector means in parallelism with the common axis of the blades in the second position of the selector means.

The shutter preferably further comprises a hollow first shaft rigid with the other blade and a second shaft rotatably mounted in the first shaft and rigid with the one blade. The turning means preferably comprises a sleeve which is movably axially on the first shaft and has a torque-transmitting projection extending through an axially parallel slot of the first shaft and into a helical groove provided in the periphery of the second shaft. Such projection serves to rotate the sleeve in response to rotation of the first shaft and to simultaneously rotate the second shaft in response to rotation of the sleeve. As the sleeve is caused to move axially of the first shaft, its projection turns the second shaft with reference to the first shaft to thereby change the size of the opening.

It is preferred to mount the selector means in such a way that it can move (preferably pivot) between the neutral position and two second positions. The camera further comprises drive means receiving motion from the motor means and arranged to move the selector means and the sleeve gradually in one of the two directions in one second position of the selector means and to move the selector means and the sleeve gradually in the other of the two directions in response to movement of the selector means to the other second position. The selector means may include a carriage which is reciprocable by hand along and is pivotable on an elongated guide rod extending in parallelism with the common axis of the shutter blades. A leaf spring or other suitable biasing means is provided to permanently urge the selector means to neutral position in which the latter is shiftable lengthwise of the guide rod. By pivoting the selector means to one side of the neutral position, the operator connects the selector means with the motor means which drives the shutter blades whereby the selector means moves gradually along the guide rod in one direction. If the selector means is pivoted by hand to the other side of its neutral position, it is again coupled with the motor means but in such a way that it travels along the guide rod in the opposite direction. In this way, the selector means causes the sleeve to turn the one blade in a clockwise or in a counterclockwise direction and to gradually increase the size of the opening to a maximum (first extreme) value or to gradually reduce the size of the opening to a minimum (second extreme) value, preferably to zero.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
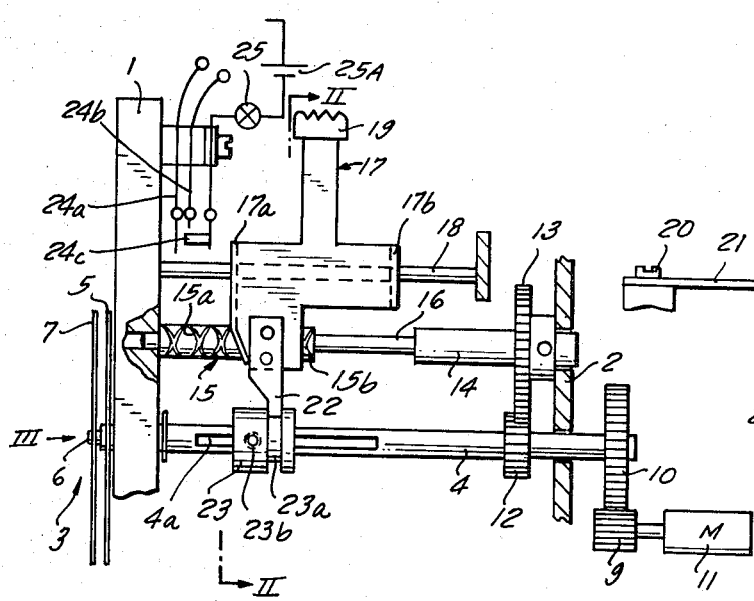
FIG. 1 is a fragmentary schematic longitudinal vertical sectional view of a motion picture camera which embodies the invention.
Figure 2:
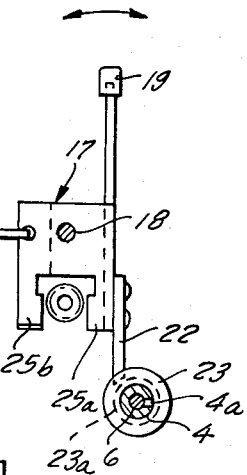
FIG. 2 is a transverse vertical sectional view as seen in the direction of arrows from the line II—II of FIG. 1.
Figure 3A:
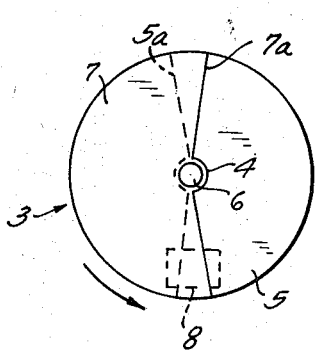
FIG. 3a is a front elevational view of the shutter as seen in the direction of the arrow III in FIG. 1.
Figures 3B, 3C:
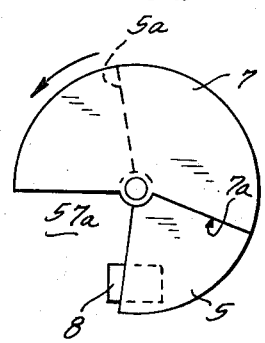
FIG. 3b is a similar front elevational view of the shutter but showing the blades in positions they assume while defining an opening of medium size.
FIG. 3c illustrates the shutter blades in positions they assume while defining an opening of maximum size.

The camera which is shown in FIGS. 1 and 2 comprises a housing or body including walls 1 and 2 which support an adjustable rotary shutter 3. The latter comprises a first or outer shaft 4 which is driven by an electric motor 11 by way of a step-down transmission including gears 9, 10. The shaft 4 carries a first shutter blade 5 and surrounds a second or inner shaft 6 which is rotatable therein and carries a second shutter blade 7. Each of the blades 5, 7 is a disk (see FIGS. 3a to 3c) which is provided with a cutout 5a, 7a, respectively. Those portions of the cutouts 5a, 7a which overlie each other together form an opening through which scene light can reach a window 8 (FIGS. 3a–3c) located in front of an unexposed film frame (not shown). FIG. 3a illustrates the blades 5, 7 in positions they assume when the shutter 3 defines an opening 57m of maximum size. If the rotational speed of the shafts 4, 6 is constant, and if the blades 5, 7 define the opening 57m, the shutter furnishes the longest exposure time because it takes longer for the aperture 57m to move past the window 8. FIG. 3b illustrates the blades 5, 7 in positions they assume when they define an opening 57a of average or medium size, for example, when the operator wishes to take pictures of a rapidly moving object. In FIG. 3a, the blades 5, 7 define an opening of zero size, i.e., the shutter is closed and prevents entry of scene light into the window 8. When the blades 5, 7 define an opening 57a or 57m (or other opening, whose size is greater or less than that of the opening 57a), they prevent entry of scene light into the window 8 when the film transporting mechanism effects stepwise advance of motion picture film during intervals between successive exposures. The exact construction of the film transporting mechanism (for example, of a mechanism which derives motion from the motor 11 and includes a customary claw pull-down) forms no part of the present invention.

As stated before, the outer shaft 4 of the shutter 3 is driven by the transmission including the gears 9, 10 the former of which is mounted directly on the output shaft of the motor 11. The inner shaft 6 normally rotates with and at the speed of the outer shaft; this inner shaft receives torque from the outer shaft through the intermediary of a torque transmitting projection or pin 23b which extends radially inwardly through an axially parallel slot 4a of the outer shaft 4 and into a helical cam groove (not specifically shown) provided in the peripheral surface of the inner shaft 6. Due to the fact that the pin 23b extends into a helical groove of the inner shaft 6, the latter's angular position with reference to the outer shaft 4 is changed automatically in response to movement of the pin 23b lengthwise of the slot 4a. This brings about a change in the size of the opening defined by the cutouts 5a, 7a of the blades 5, 7.

In accordance with a feature of the present invention, the size of the opening defined by the blades 5, 7 can be varied in a number of ways, namely, manually by way of a manually operated carriage or selector 17 or motorically, i.e., by the motor 11 but again by way of the selector 17. To this end, the camera comprises a drive including an auxiliary shaft 14 which is parallel to the shafts 4, 6 and is rotatable in the walls 1, 2. This auxiliary shaft is driven by a second step-down transmission which includes a smaller-diameter gear 12 on the outer shaft 4 and a larger-diameter gear 13 on the auxiliary shaft. A portion of the auxiliary shaft 14 constitutes a spindle 15 which is formed with left-hand helical threads 15a and with right-hand helical threads 15b. The spindle 15 is adjacent to the left-hand end (as viewed in FIG. 1) of a smaller-diameter intermediate or disconnecting portion 16 of the auxiliary shaft 14.

The aforementioned selector 17 has a handgrip portion or knob 19 which extends from the housing of the motion picture camera and can be manipulated by hand to move the selector along an elongted guide rod 18 which is mounted in the housing of the camera or to pivot the selector about the axis of the guide rod. The latter is parallel to the shafts 4, 6 and 14. Biasing means here shown as including a single leaf spring 21 is fastened to the housing by a screw 20 and serves to urge the selector to a neutral position which is shown in FIGS. 1 and 2; in such neutral position, the selector can be moved by hand lengthwise of the guide rod 18 to be normally located substantially midway between the axial ends of the guide rod 18 so that its position corresponds to the average size 57a of the opening defined by the shutter blades 5 and 7. The operative connection between the torque transmitting pin 23b and the selector 17 comprises a turning means here shown as a sleeve 23 which is axially movably mounted on the outer shaft 4 and has a circumferential groove 23a for a projection or finger 22 of the selector 17. The finger 22 remains in the groove 23a in each axial or angular position of the selector 17 so that the axial position of the selector determines the axial position of the sleeve 23. The latter is rigid with the pin 23b, i.e., the axial position of the sleeve 23 determines the size of the opening defined by the blades 5, 7 in dependency on the axial position of selector 17 with reference to the guide rod 18. It is preferred to provide the selector 17 with a suitable index which is movable along a fixed scale (not shown) on the housing of the motion picture camera. The scale is calibrated to indicate various exposure times as a function of the axial position of the selector 17. The position of the index and scale can be reversed.

In the position shown in FIG. 1, the selector 17 maintains the blade 7 in such angular position with reference to the blade 5 that the cutouts 5a, 7a of these blades define an aperture 57a (FIG. 3b) of average size, i.e., the shutter 3 then furnishes a relatively short exposure time. If the selector 17 is caused to move in a direction to the right, as viewed in FIG. 1, the finger 22 shifts the sleeve 23 in the same direction and the pin 23b changes the angular position of the blade 7 so that the cutouts 5a, 7a ultimately define the maximum opening 57m shown in FIG. 3c. By shifting the selector 17 all the way to the left, as viewed in FIG. 1, the operator closes the shutter opening (FIG. 3a). At the same time, a shoulder or actuating means 17a of the selector 17 causes opening of an electric switch which includes contacts 24a, 24b installed in the circuit of the motor 11 so that the latter is arrested in automatic response to complete closing of the opening defined by the blades 5 and 7. The contact 24a constitutes with a third contact 24c a second switch which closes in response to opening of the switch 24a, 24b to thereby complete the circuit of a signal lamp 25 which is preferably observable in the view finder of the motion picture camera and is connected in series with a battery 25A or another suitable source of electrical energy. This same source can also supply current to the motor 11. Among others, the lamp 25 signals to the operator that the opening of the shutter is closed and that the motor 11 is at a standstill.

As stated before, the selector 17 is not only movable axially along but is also pivotable back and forth about the axis of the guide rod 18. Such pivotal movements of the selector 17 are utilized to effect gradual changes in the size of the shutter opening by way of the drive which derives motion from the motor 11 and includes the transmissions 9, 10 and 12, 13, auxiliary shaft 14 and two motion receiving spindle nuts 25a, 25b of the selector 17. As shown in FIG. 2, the spindle nuts 25a, 25b flank the spindle 15 of the shaft 14, i.e., they are located diametrically opposite each other with reference to the axis of the spindle. The arrangement is such that the nut 25a has suitable configurated threads which can readily engage the threads 15a and that the nut 25a has suitable configurated threads which can readily engage the threads 15a and that the nut 25b has threads which can readily engage the threads 15b of the spindle 15.

When the operator pivots the knob 19 of the selector 17 from the neutral position in a clockwise direction, as viewed in FIG. 2, the nut 25a engages the threads 15a of the sprindle 15 whereby the selector 17 moves gradually along the guide rod 18 until its shoulder 17a opens the switch 24a, 24b to arrest the motor 11. Such pivotal movement of the selector 17 is carried out when the operator wishes to produce a fade-out effect. Completion of the fade-out effect is indicated by the signal lamp 25. In order to produce a fade-in effect, the operator pivots the selector 17 from the neutral position in a counterclockwise direction, as viewed in FIG. 2, so as to engage the nut 25b with the threads 15b of the spindle 15. The motor 11 then causes the selector to travel gradually in a direction toward the gear 13 until the nut 25b moves beyond the spindle 15, i.e., until the nut 25b reaches the smaller-diameter portion 16 of the auxiliary shaft 14. This completes the fade-in effect. If desired, the camera may be provided with a second signalling device which is actuated by the other shoulder 17b of the selector 17 when the latter moves to its right-hand end position, as viewed in FIG. 1, to indicate completion of the fade-in effect. Such second signalling device may include a second lamp which is observable in the view finder.

If the fade-out effect is to be followed immediately by a fade-in effect, the operator pivots the selector 17 (in the left-hand end position, as viewed in FIG. 1) in a counterclockwise direction, as viewed in FIG. 2, so as to move the nut 25b into engagement with the threads 15b of the spindle 15 and to disengage the shoulder 17a from the contact 24c so that the switch 24a, 24b closes and starts the motor 11 which then advances the selector 17 in a di- the nuts 25a, 25b preferably engages the spindle 15 in re- gradual increase in the size of the shutter opening. One of the nuts 25a, 25b preferably engages the spindle 15 in response to a smaller angular displacement of the selector 17 about the guide rod 18.

When the operator releases the knob 19, the spring 21 returns to unstressed position and automatically disengages the nut 25a or 25b from the spindle 15. The spring 21 can also serve as a means for automatically returning the selector 17 to the central position of FIG. 1 in which the shutter 3 furnishes an exposure time of average length.

The switch 24a, 24b and the disconnecting portion 16 of the spindle 14 constitute two desirable features of our camera. They serve as a means for automatically arresting the motor 11 or for disconnecting the selector 17 from the motor 11 when the selector reaches the one or the other end position upon lengthwise movement along the guide rod 18. Thus, the operator of the camera need not manipulate the master switch of the camera because the motor 11 is arrested as soon as the size of the opening defined by the blades 5, 7 is reduced to zero (FIG. 3a). On the other hand, the motor can continue to run but the selector 17 is disconnected therefrom when the size of the opening is increased to the maximum value 57m shown in FIG. 3c.

The signal lamp can be omitted if the switch 24b, 24c is connected in circuit with the light meter of the camera so that the needle of the light meter assumes a predetermined position indicating completion of the fade-out operation when the switch 24b, 24c is closed by the shoulder 17a in response to movement of the selector to one of its end positions lengthwise of the guide rod 18.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a motion picture camera, a combination comprising an adjustable shutter having a pair of coaxial rotary blades defining a light-admitting opening, one of said blades being turnable with reference to the other blade to thereby change the size of said opening; turning means movable along the common axis of said blades and operatively connected with said one blade to turn the latter and to thus increase or reduce the size of said opening while respectively moving in a first and a second direction; selector means coupled with said turning means and having a neutral position in which it is movable by hand in parallelism with said axis to move said turning means in a desired one of said directions, said selector means having at least one second position; and motor means for moving said selector means in parallelism with said axis in said second position thereof.

2. A combination as defined in claim 1, wherein said shutter further comprises a hollow first shaft rigid with said other blade and a second shaft rotatably mounted in said first shaft and rigid with said one blade, said turning means comprising a sleeve mounted on and movable axially of said first shaft and having a torque transmitting portion coupling said second shaft to said first shaft.

3. A combination as defined in claim 1, wherein said selector means is movable between said neutral position and two second positions, and further comprising drive means receiving motion from said motor means and arranged to move said selector means and said turning means in one of said directions in one second position of said selector means and to move the selector means and the turning means in the other of said directions in the other second position of said selector means.

4. A combination as defined in claim 3, further comprising guide means reciprocably supporting said selector means and extending in parallelism with said axis.

5. A combination as defined in claim 4, further comprising means for biasing said selector means to neutral position.

6. A combination as defined in claim 5, wherein said selector means is pivotable on side guide means between said neutral position and said second positions thereof.

7. A combination as defined in claim 6, wherein said drive means comprises a rotary spindle driven by said motor means and a pair of spindle nuts provided on said selector means and each meshing with said spindle in one second position of said selector means.

8. A combination as defined in claim 7, wherein said spindle is provided with left-hand threads and with right-hand threads and wherein one of said spindle nuts meshes with said left-hand threads in one second position of said selector means and the other spindle nut meshes with said right-hand threads in the other second position of said selector means.

9. A combination as defined in claim 8, wherein said spindle nuts flank said spindle.

10. A combination as defined in claim 9, wherein said spindle nuts are located substantially diametrically opposite each other with reference to the axis of said spindle.

11. A combination as defined in claim 9, wherein the threads of said spindle nuts are such that they can readily engage with the respective threads of said spindle in response to movement of the selector means to corresponding second position.

12. A combination as defined in claim 3, further comprising signal generating means arranged to produce a signal in response to such displacement of said selector means by way of said drive means which corresponds to an extreme size of said opening.

13. A combination as defined in claim 12, wherein said signal generating means is observable in the view finder of the camera.

14. A combination as defined in claim 3, wherein said drive means is arranged to move said selector means, in one of said second positions thereof, to an end position in which said turning means causes said one blade to define with said other blade an opening of zero size, and further comprising means for arresting said motor means in response to movement of said selector means to said end position.

15. A combination as defined in claim 14, wherein said motor means comprises an electric motor and wherein said arresting means comprises electric switch means in circuit with said motor, said selector means being arranged to open said switch means in said end position thereof.

16. A combination as defined in claim 14, further comprising signal generating means arranged to produce a detectable signal in response to movement of said selector means to said end position thereof.

17. A combination as defined in claim 16, wherein said signal generating means is a lamp which is observable in the view finder of the camera.

18. A combination as defined in claim 3, wherein said drive means is arranged to move said selector means, in one of said second positions thereof, to an end position in which said turning means causes said one blade to define with the other blade an opening of maximum size, and further comprising signal generating means arranged to produce a detectable signal in response to movement of said selector means to said end position thereof.

19. A combination as defined in claim 18, wherein said signal generating means comprises electric switch means which is actuated by said selector means in said end position thereof.

20. A combination as defined in claim 1, wherein said blades are arranged to define two openings of extreme size including an opening of maximum size and an opening of minimum size, and a plurality of openings of intermediate size, and wherein said drive means comprises means for automatically disconnecting said selector means from said motor means when the blades of said shutter define an opening of extreme size.

21. A combination as defined in claim 20, wherein said drive means comprises a rotary spindle having a threaded portion and a second portion and wherein said selector means comprises motion receiving means engaging with said threaded spindle portion in one of said second positions of said selector means to thereby move said motion receiving portion toward said second spindle portion, said second spindle portion constituting said disconnecting means.

References Cited

UNITED STATES PATENTS

| 1,914,664 | 6/1933 | Fear | 352—217 |
| 2,045,260 | 6/1936 | Bergrenn | 352—217 |
| 2,117,694 | 5/1938 | Becker | 352—217 |

FOREIGN PATENTS

| 340,049 | 8/1921 | Germany. |
| 345,318 | 12/1921 | Germany. |

LOUIS R. PRINCE, Primary Examiner

F. SHOON, Assistant Examiner

U.S. Cl. X.R.

352—217